United States Patent [19]

Mumzhiu

[11] Patent Number: 4,609,817
[45] Date of Patent: Sep. 2, 1986

[54] OPTICAL SHAFT POSITION SENSOR

[75] Inventor: Alexander M. Mumzhiu, Oak Park, Mich.

[73] Assignee: Mid-West Instrument - Div. Astra Associates, Inc., Troy, Mich.

[21] Appl. No.: 482,946

[22] Filed: Apr. 7, 1983

[51] Int. Cl.⁴ ............................................. G01D 5/34
[52] U.S. Cl. ............................... 250/231 SE; 250/227
[58] Field of Search ................ 250/227, 230, 231 R, 250/231 SE, 231 P, 234, 235, 236; 356/395; 455/602, 615; 340/365 P; 362/26, 29, 30

[56] References Cited

U.S. PATENT DOCUMENTS

| | | | |
|---|---|---|---|
| 2,182,717 | 12/1939 | Chance | 172/239 |
| 2,361,973 | 11/1944 | Smith | 250/230 |
| 2,447,344 | 8/1948 | Kliever | 250/231 R |
| 3,054,928 | 9/1962 | Schrenk et al. | 250/231 R |
| 3,092,434 | 6/1963 | Vinet | 346/107 |
| 3,209,320 | 9/1965 | Earthman | 340/15.5 |
| 3,237,012 | 2/1966 | Treffeisen | 250/231 SE |
| 3,290,593 | 12/1966 | Crowdes | 250/231 R |
| 3,351,767 | 11/1967 | Suiter | 250/230 |
| 3,355,593 | 11/1967 | Gately et al. | 250/231 R |
| 3,693,022 | 9/1972 | Dumast et al. | 250/231 R |
| 3,725,817 | 4/1973 | Nolan | 350/285 |
| 3,742,486 | 6/1973 | Skidmore | 340/347 P |
| 3,940,609 | 2/1976 | Johnstun | 250/231 SE |
| 4,142,149 | 2/1979 | Nador | 324/157 |
| 4,214,154 | 7/1980 | Sato | 250/235 |
| 4,218,726 | 8/1980 | Fukusawa et al. | 362/26 |
| 4,279,507 | 7/1981 | Bulpitt | 356/225 |
| 4,291,976 | 9/1981 | McMahon | 250/231 SE |
| 4,300,548 | 11/1981 | Jones | 128/204.21 |
| 4,304,460 | 12/1981 | Tanaka et al. | 350/96.16 |
| 4,344,666 | 8/1982 | Birgmeir et al. | 350/6.9 |
| 4,352,550 | 10/1982 | Uchida | 350/96.2 |
| 4,380,043 | 4/1983 | Takamatsu et al. | 362/26 |

FOREIGN PATENT DOCUMENTS 570684 7/1945 United Kingdom .

OTHER PUBLICATIONS

Mid-West Instrument Sales Bulletin No. LLC80, Mar., 1981.
"A Guide to Optical Shaft Encoders", by C. Hudson, Instruments & Control Systems, May 1978.

*Primary Examiner*—David C. Nelms
*Attorney, Agent, or Firm*—Burton, Parker & Schramm

[57] ABSTRACT

An optical sensor for determining the position of a rotating shaft, comprised of a first and second light deflecting means, a light sensing means, and a means for providing a source of light. The second means for deflecting light is mounted on the shaft and rotates as the shaft turns, deflecting light from an axial path parallel to the shaft to a second radial light path. The shaft extends through and turns relative to a first light deflecting means which deflects light from a first radial path to the axial path optically coupling the first and second radial light path as the shaft turns. A source of light and light sensing means are provided in the radial light paths which are optically coupled at discrete shaft positions.

31 Claims, 8 Drawing Figures

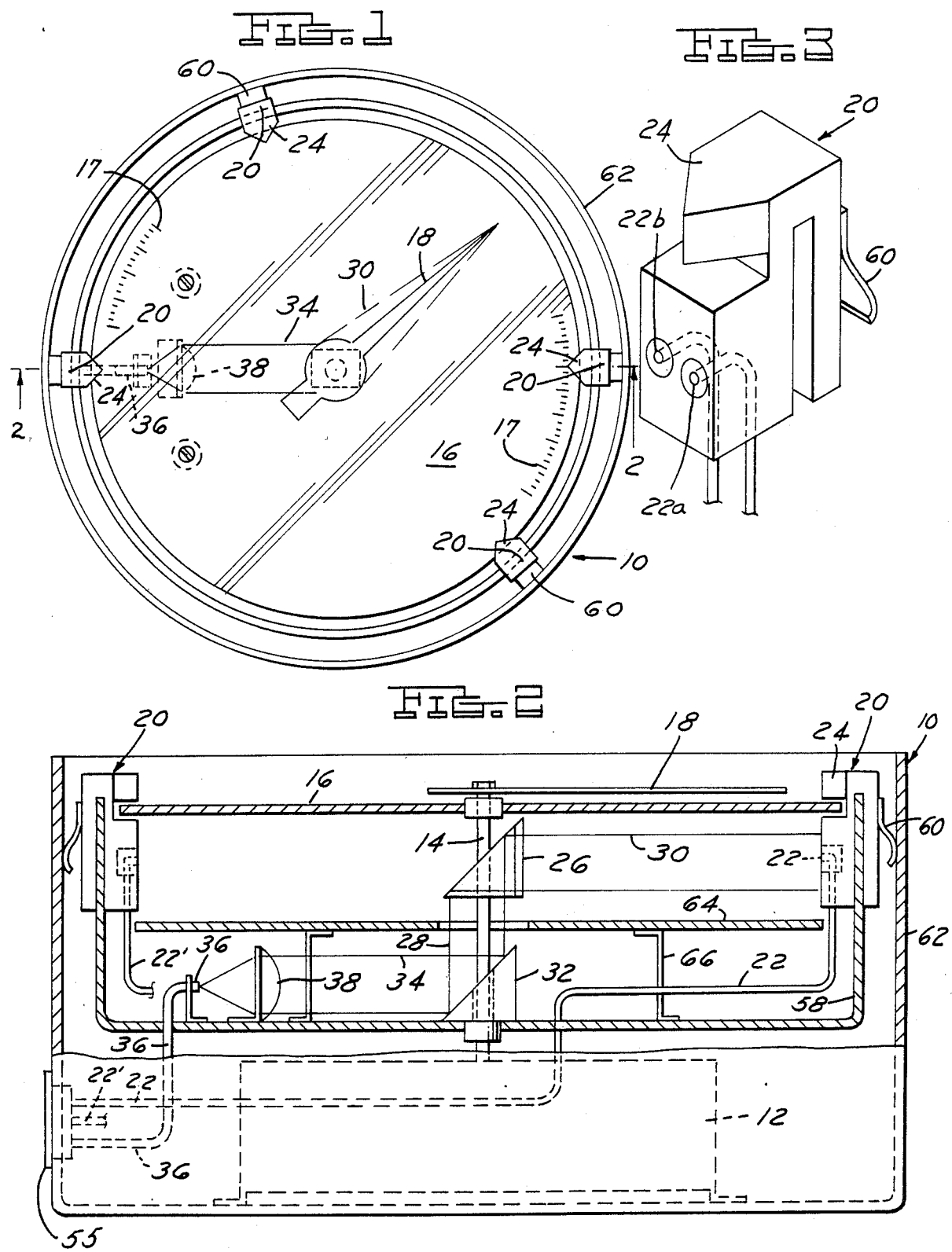

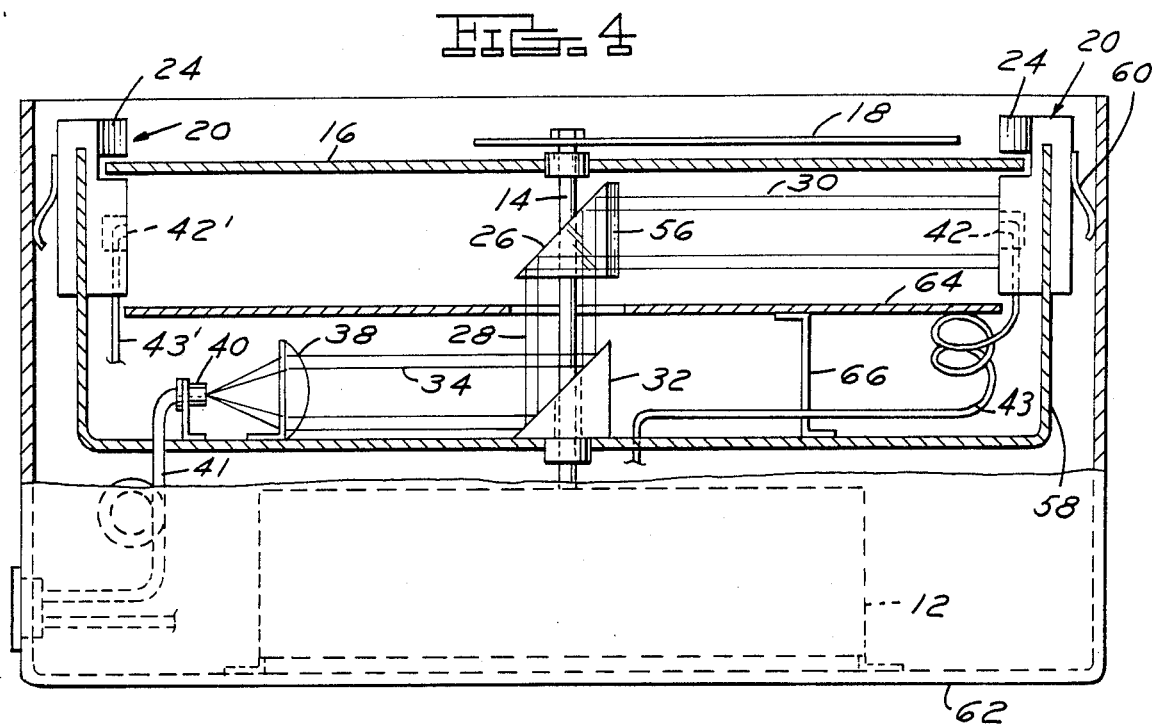
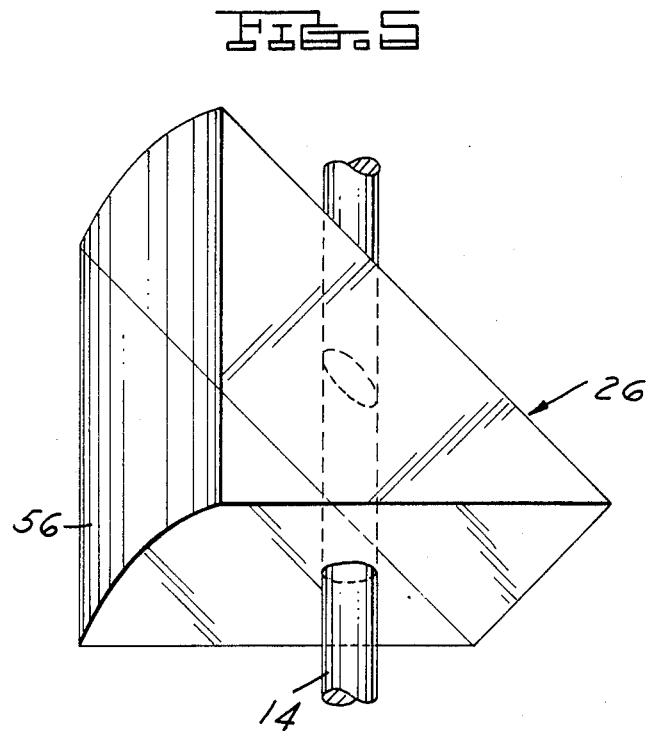

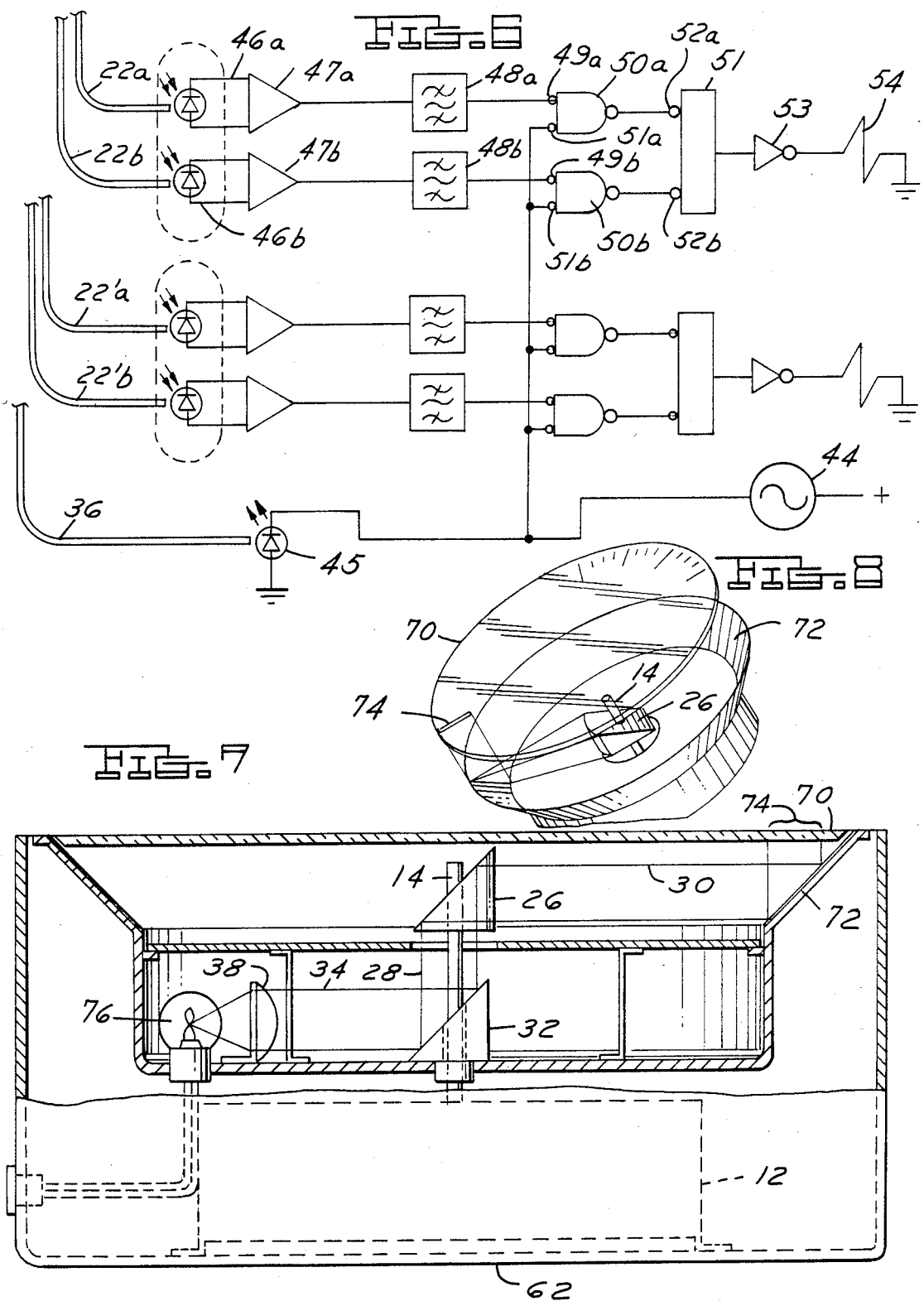

OPTICAL SHAFT POSITION SENSOR

FIELD OF INVENTION

This invention relates to the field of shaft position sensors and more particularly to instruments employing sensors which use an optical means to detect the position of a shaft.

BACKGROUND OF INVENTION

It is frequently necessary to obtain a signal to indicate the position of a shaft located in an instrument or measurement device where installing a mechanical or electromechanical contact would hinder the free rotation of the shaft. In the past optical devices have been fabricated to achieve this result, but these devices either have a limited range of angular rotation or are heavy and complex. An optical shaft position sensor is shown in U.S. Pat. No. 3,940,609. This device has a split cylindrical prism affixed to the rotating shaft which deflects light coming from a radial source. The angle at which this light is deflected is dependent upon the position of the shaft and prism. A series of photodiodes are used to indicate the location of the shaft. One problem with this type of device is that travel is limited to about 180° and therefore this device can only be used where shaft position readings are only taken during this limited portion of the shaft's rotation.

Another example of a device which uses a prism affixed to the shaft to determine shaft position optically is shown in U.S. Pat. No. 3,351,767. A light source, the shaft which supports a pair of cylindrical prisms, and a photodiode are all located along a single axis. The prism is designed such that light will only pass through the prism and strike the photodiode when the shaft connected to the prism is oriented so that the light strikes the prism at less than the critical angle. The range of shaft rotation in which light will pass cannot be changed, as it is fixed dependent upon the physical properties of the prism.

An example of another prior art device is shown in U.S. Pat. No. 2,182,717 relating to a control system for a dirigible which senses the position of a compass and adjusts the rudder to maintain the craft on course. A reflector is mounted along the axis of rotation of a compass to deflect a light source mounted above the compass radially to a light sensitive control unit. The control unit may be located at any compass heading, and the shaft is free to turn 360°. The light source is similarly mounted above the compass, resulting in an appearance different than that of a typical compass, and obstructing the user's view of the dial face.

An example of another prior art device used to optically indicate the position of a shaft is an optical position encoder. Encoders are capable of producing a binary signal which will indicate the position of the shaft. The resolution of an optical encoder will vary dependent upon the number of bits or binary codes present in the output signal. The operation of an optical shaft encoder is described in an article by Charles Hudson published in *Instruments and Control Systems*, May 1978, entitled "A Guide to Optical Shaft Encoders." The primary disadvantage of an optical shaft encoder is that the disk attached to the rotating shaft can substantially increase the inertia of the shaft and degrade performance of the instrument. The size of the optical encoder may also be a problem in some applications.

SUMMARY OF INVENTION

I have discovered an apparatus to indicate when position of a rotating shaft, such as the shaft of an instrument, has reached or exceeded a specified level. This apparatus may be conveniently located within an instrument having a shaft which rotates responsive to a parameter being measured. The apparatus may be located below the dial face so that the instrument can otherwise function normally. A shaft position is indicated using a rotating light deflector which is affixed to the shaft allowing it to rotate freely without friction, as would be associated by mechanical or electromechanical contacts.

The invention comprises a rotating shaft, a first and second light deflecting means, a light sensing means and a means for providing a source of light. The shaft extends through and turns relative to the first light deflecting means, which is stationary. The first light deflecting means deflects light between a first radial light path and an axial path. The second light deflecting means deflects light between the axial path, which is parallel to the axis of rotation of the shaft, and a second radial light path which extends radially from the shaft. The first and second radial light paths remain optically coupled as the shaft rotates. The second radial light path turns as the shaft and second light deflecting means rotates. A light sensing means is provided in one of the radial light paths for intercepting the light and indicating shaft position. The other radial light path has a means for providing a source of light.

The light deflecting means may be a prism or a mirrored surface which deflects light between the axial path and a radial path. As the second light deflecting means rotates with the shaft, the second radial light path will illuminate the sensing means at a discrete shaft position. Preferably, the light sensing means will be a photodiode or an optic fiber which is located radially spaced from the shaft. In an instrument the sensing means will be located at the periphery of the housing so that the second light deflecting means will align the second radial light path with the sensing means when the shaft has reached the desired position. Any number of sensors may be used, and the sensors may be capable of being moved along the periphery of the instrument so that indication of the position of the shaft may be made at any desired level.

A means for providing light may be conveniently located within the housing of the instrument below the conventional dial face. The term "light" is used in the specification and claims in a generalized sense and is not limited merely to the visible spectrum. The term "light" is defined as electromagnetic radiation of all frequencies including but not limited to infrared, visible, and ultraviolet ranges. Light may be provided by a light bulb, laser, light emitting diode, optical fiber connected to a remote source, or other means. This light may be collimated into the first radial path by a collimating lens to engage the first light deflecting means such as a mirror inclined to reflect the light along the axial path to strike the second light deflecting means. The shaft can thereby freely turn and light will be continuously provided to the second light deflecting means which deflects light radially to strike the sensing means mounted along the periphery of the instrument housing. The light deflecting means mounted to the shaft, as indicated, can be a mirror or prism and preferably is capable of focusing the light deflected radially into a narrow band.

The light sensing means may alternatively comprise a pair of spaced apart sensors which are illuminated as the shaft rotates. The output of these sensors, when coupled with a control circuit, will allow a determination to be made as to whether the parameter being measured by the instrument is above or below the level of the sensing means. This feature would be useful to sound a warning buzzer, for example, when a measured parameter exceeds a specified level.

BRIEF DESCRIPTION OF THE DRAWINGS

FIG. 1 is a top view of an instrument employing this invention;

FIG. 2 is a sectional view taken along line 2—2 of the fiber optic version of this invention;

FIG. 3 is an objective view of the sensing means of the fiber optic version of this invention;

FIG. 4 is a side elevation similar to FIG. 2 of an electro-optic version of the invention;

FIG. 5 is an objective view of a right angle prism having a cylindrical lens facet;

FIG. 6 is a schematic diagram of the electro-optic control circuit;

FIG. 7 is a cross-sectional side elevation of another embodiment of the invention; and FIG. 8 is an exploded objective view of the embodiment of the invention shown in FIG. 7.

BRIEF DESCRIPTION OF THE PREFERRED EMBODIMENT

Referring to FIGS. 1-3 of the drawings, a fiber optic version of the invention is shown. In instrument 10 there is a device 12 shown in phantom outline which turns shaft 14 responsive to changes in a parameter being measured, such as fluid pressure, temperature, or the like. Shaft 14 extends through dial face 16 which is marked with indicia 17 indicating units of the measured parameter. A pointer 18 is affixed to shaft 14 to provide a visual indication of the measured parameter level, as is common in the great majority of the dial type instruments employing a rotating shaft. The instrument employing this invention will have one or more set pointers 20 located along the periphery of the instrument. Set pointers 20 will have light sensing means located below the dial face, such as optic fiber 22, and a pointer portion 24 above the dial face providing a visual indication of set pointer position. The optic fibers 22 of the set pointer are illuminated by the second light deflecting means such as prism 26 mounted on the shaft 14. The prism 26 deflects light from an axial light path 28 which is parallel to the axis of shaft 14, to the second radial light path 30. When shaft 14 is oriented so that pointer 18 is aligned with the set pointer, prism 26 will deflect light from the axial light path 28 along the second light path 30 to illuminate the optic fiber 22 attached to set pointer 20.

Light is supplied to prism 26 along the axial light path by a first light deflecting means located along the axis of the shaft, such as mirror 32 shown in FIG. 2. Mirror 32 is inclined to deflect light from a first radial light path 34 to the axial light path 28 parallel to shaft 14. A means supplying a source of light to the first radial path 34 is provided within the instrument housing as shown by optic fiber 36 and lens 38 in FIG. 2. Alternatively, light may be supplied by a light emitting diode 40 and the light sensed by photodiode 42 as shown in the embodiment in FIG. 4. In FIG. 4 wires 41, 43, and 43' replace fiber optic cables 36, 21 and 21' shown in FIG. 2 and provide a means for connection of the instrument to the control circuit.

As seen in FIGS. 2 and 4, when shaft 14 is oriented to align pointer 18 with set pointer 20, light is deflected to illuminate the sensing means 22 or 42, providing an indication of shaft position. While the light source could be mounted in the set pointer 20 and the sensing means in the first radial path 34, it is preferred that a single light source be used in the radial path 34 so that a plurality of set pointers 20 may be used, each of which may contain two light sensors means 22a and 22b as shown in FIG. 3.

As the shaft rotates past a set pointer, the light sensors 22a and 22b are illuminated sequentially. The optic signals thus produced are used by a control circuit to supply a warning light or alarm when the measured parameter exceeds or drops below the level indicated by the position of the set pointer. It is envisioned that a great number of electrical-optic circuits may be used to interpret the optic signals provided by the set pointer. An example of a typical circuit is shown in FIG. 6.

The control circuit shown in FIG. 6, in addition to interpreting the optic signals received from the set pointer, is used to supply a light source to the first radial light path 34 by way of optic fiber 36. By using a light source which varies in amplitude, or is a modulated square wave form, the control circuit can look for a modulated response from the set pointers having the same phase and the same frequency. This way, the problem of extraneous light resulting in an erroneous signal may be avoided. A signal generator 44 provides a fixed frequency input to light emitting diode 45. Light from the light emitting diode is transmitted by the optic fiber 36 to the instrument and provides the light for the first radial light path 34 and in turn to the axial path 28 and the second radial path 30 which rotates with the shaft as previously described. The second radial light path may be aligned with the set pointer. The sensors 22a and 22b in each set pointer 20 are sequentially illuminated.

In a fiber optic version of this invention shown in FIG. 2 for use with the control circuit shown in FIG. 6, the ends of optic fibers 22 act as light sensors. The two optic fibers 22a and 22b in each set pointer 20 transmit optic signals to photodiodes 46a and 46b in the control circuit. The output of each of the photodiodes is transmitted to an amplifier 47a and 47b. The amplified signals pass through bandpass filters 48a and 48b which only allow signals to pass which are the same frequency as provided by signal generator 44. The filtered outputs of bandpass filters 48 are connected to the inputs 49a and 49b of NAND gates 50 and 50a. Inputs 51a and 52b of the NAND gates are connected to the output of signal generator 44. NAND gate inputs 51 serves as a trigger to allow a signal to pass through the gate when both inputs 49 and 51 to a NAND gate are positive. The NAND gates, therefore, require that the output of bandpass filter 48 be in phase with signal generator 44. This prevents an extraneous light source which happens to be the same frequency as the signal generator from inadvertently activating the control circuit. The output of the NAND gates which are associated with each of the optic fibers 22a and 22b are then transmitted to an RS flip-flop device 51 having two inputs 52a and 52b. When RS flip-flop inputs 52a and 52b are sequentially energized, first a and then b, the device's output will become positive and will remain positive even though neither input remains positive. When the RS flip-flop inputs 52a and 52b are energized in the reverse order, first b and then a, the output will fall to zero once again. The output of RS flip-flop 51 is amplified by amplifier 53 which can be used to energize the output device 54, which provides a signal indicating shaft position.

The bandpass filter 48 and the NAND gates 50 form a discriminator circuit to prevent extraneous light from activating the RS flip-flop. If extraneous light is not a factor, the output of amplifiers 47 could be connected directly to RS flip-flop 51.

FIG. 6 shows an electrical fiber optic control circuit compatible with the fiber optic version of the instrument shown in FIG. 2. This type of device is very useful when the instrument is to be installed in explosive atmospheres, when it is desirable to remove all electrical components from the instrument. Fiber optic cables may be used to connect the instrument to the control circuit of the type shown in FIG. 6 which is remotely located. A fiber optic connector 55 (see FIG. 2) may be installed in the housing so that the fiber optic cable can be easily coupled, connecting the instrument fibers 22, 22' and 36 to the remote control circuit. When the instrument is not going to be used in an explosive atmosphere, a light emitting diode 40 and photodiode 42 may be used as a sensing means, as in the electro-optic version of the invention shown in FIG. 4.

In order to obtain better sensitivity, eliminate shadows of shaft at the set pointer and for more precise operation, the light deflecting means affixed to the shaft should have the ability to focus a light. Prism 26, shown in FIG. 5, has a cylindrical lens 56 formed in one facet to focus the light directed toward the light sensing means in the second radial light path 30 into a narrow band. The narrow light band formed by the projection of the second radial light path 30 when it reaches the radial distance of the light sensors in set pointer 20 is significantly taller in the direction parallel to the axis of rotation than the width of a section of the band which passes across the light sensors. The advantage of using a cylindrical lens to focus the light in the second radial light, rather than a concave lens giving a single point of focus, is that precise alignment of the prism, shaft and the light sensors is not required. The second light deflecting means, however, is not limited to the prism shown in FIG. 5, but could be a mirror surface which is inclined to deflect light from the axial path 28 radially to the first light path 30. Focusing, using a mirror reflecting surface could be achieved by making its surface concave cylindrically.

Further details of the preferred embodiment of the invention may be ascertained from FIG. 2. Set pointers 20 are slidably mounted on set pointer support 58. Spring 60 is attached to each set pointer 20 and engages instrument housing 62 retaining the set pointer in the desired location. Partition 64 is mounted below second radial light path 30 on legs 66 to prevent optic fibers 22 from entering the radial light path 30.

An alternative embodiment of the invention is illustrated in FIGS. 7 and 8. The light sensing means in the embodiment shown is a dial face 70 marked with indicia indicating units of the measured parameter. Rather than using a pointer affixed to the shaft to indicate shaft position, light deflecting means such as prism 26 directs light radially along the second radial light path 30 to illuminate a section of the dial face indicating shaft position. In FIG. 7, the radial light path 30 is deflected against the dial face by the third light deflecting means, mirror 72. Mirror 72 is in the shape of a conical band surrounding shaft 14, having a surface inclined in an acute angle relative to shaft 14 to deflect light from second radial light path 30 against dial face 70. Prism 26 has a facet formed into a cylindrical lens so that the light focused on the dial face illuminates a narrow radial segment 74 as shown in FIG. 8. An incandescent light bulb 76 is used as a source of light in the FIG. 7 embodiment. However, other means can be used, provided they have sufficient output to illuminate the dial face. The optical shaft position sensor shown in FIGS. 7 and 8 may additionally have a pointer to indicate shaft position similar to that shown in FIGS. 1 and 2 as pointer 18. Furthermore, this embodiment of the invention may, if desired, be equipped with set pointers similar to that shown in FIGS. 1-4 to also provide a remote indication of shaft position.

It is envisioned that this invention may be used with any equipment or machinery having a rotating shaft where it is desired to know shaft position. The signal provided by the sensing means can also be used to provide an angular velocity output or to count shaft revolutions using commonly known tachometer and counter circuitry.

I claim:

1. An optical shaft position sensor comprising:
    a rotatable shaft;
    first light deflecting means for deflecting light between an axial path extending parallel to the shaft and a first path which extends radially from the shaft;
    second light deflecting means mounted on the shaft for rotation therewith to deflect light between the axial path and a second path axially spaced from the first path and extending radially from the shaft whereby said first and second light paths are optically coupled;
    light receiving means for intercepting the light in one of the radial paths independent of the second light deflecting means to indicate shaft position; and
    means for providing a source of light for the other radial path.

2. The optical shaft position sensor of claim 1 wherein the second light deflecting means further comprises means for focusing the light deflected radially, and said second light deflecting means rotates relative to said light receiving means and means for providing a source of light.

3. The optical shaft position sensor of claim 2 wherein the second light deflecting means comprises a prism; and the shaft extends through and turns relative to the first light deflecting means.

4. The optical shaft position sensor of claim 3 wherein the means to focus light comprises a lens formed on one facet of the prism.

5. The optical shaft position sensor of claim 2 wherein
    said second light deflecting means is further provided with means to focus light in the second path into a narrow band at a focal length substantially equal to the distance of the light receiving means, said narrow band being significantly taller in the direction parallel to the axis of the shaft than the width of the section of the band which passes across the light receiving means; and
    the shaft extends through and turns relative to the first light deflecting means.

6. The optical shaft position sensor of claim 5 wherein said second light deflecting means comprises a prism having cylindrical lens on one facet to focus light in the second path into the narrow band.

7. The optical shaft position sensor of claim 6 wherein the prism is a right triangle shape having the cylindrical lens in the facet forming the surface in the second path, the axis of said cylindrical lens being parallel to the axis of the shaft.

8. The optical shaft position sensor of claim 1 wherein the means for receiving light comprises a dial face onto which the radial light beam strikes illuminating a portion thereof to provide a visual indication of shaft position.

9. The optical shaft position sensor of claim 8 which further comprises a third light deflecting means to deflect light from the second path as a function of shaft position, which rotates relative thereto onto the dial face.

10. The optical shaft position sensor of claim 9 wherein:
light from the second path is deflected substantially parallel to the axis of the shaft; and
the dial face is perpendicular to the shaft axis.

11. The optical shaft position sensor of claim 8 wherein the light deflecting means mounted on the shaft focuses the light into a narrow band, so that when light strikes the dial face a narrow radial segment is illuminated which has a radial length substantially longer than the width.

12. The optical shaft position sensor of claim 11 further comprised of a third light deflecting means comprising a conical band around the shaft having a mirrored surface which is inclined at an acute angle relative to the shaft axis to deflect light from the second path against the dial face.

13. The optical shaft position sensor of claim 1 wherein the light receiving means comprises:
a pair of light receiving means, each providing an output light signal when light from the second path is oriented to illuminate each receiving means, said receiving means being angularly spaced apart to be sequentially illuminated as the shaft is rotated; and
means responsive to the output signal of said receiving means for indicating shaft position.

14. The optical shaft position sensor of claim 13 wherein the pair of light receiving means comprise:
a pair of optic fibers providing an output light signal; and
the means for indicating shaft position comprises an electrical circuit having a pair of photodiodes to convert the output light signal of each optic fiber to an electrical signal.

15. The optical shaft position sensor of claim 14 wherein the means for providing a source of light further comprises:
a source of light oscillating at a fixed frequency to be optically coupled to the first path; and
the means for indicating shaft position further comprise means to condition the output of the photodiodes to only allow the transmission of a signal of the same frequency and phase as the source of light.

16. The optical shaft position sensor of claim 15 wherein the means for indicating shaft position further comprises an RS flip-flop, the two inputs of which are connected to the conditioned output of the pair of photodiodes so that the output of the RS flip-flop will switch from OPEN to CLOSED as the second radial light path moves from one side of the light sensing means pair to the other, sequentially illuminating them, the RS flip-flop output will revert to the OPEN condition when the light deflecting means is rotated in the opposite direction, causing both of the light sensing means to be illuminated in the reverse sequence.

17. In an instrument for measuring a variable parameter, the combination comprising:
a shaft;
means for rotating the shaft responsive to changes in the measured parameter;
first light deflecting means for deflecting light between an axial path parallel to the shaft and a first path which extends radially from the shaft;
second light deflecting means mounted on the shaft for rotation therewith to deflect light between the axial path and a second path axially spaced from the first path extending radially from the shaft so that the first and second light paths are optically coupled;
light receiving means for intercepting the light in one of the radial paths independent of the second light reflecting means to indicate shaft position; and
means for providing a source of light for the other radial path.

18. The instrument of claim 17 wherein the second light deflecting means further comprises means for focusing the light deflected radially, and said second light deflecting means rotates relative to said light receiving means and means for providing a source of light.

19. The instrument of claim 18 wherein
said second light deflecting means will focus light in the second path into a narrow band at a focal length substantially equal to the distance of the light receiving means, said narrow band being significantly taller in the direction parallel to the axis of the shaft than the width of the section of the band which passes across the light receiving means; and
the shaft extends through and turns relative to the first light deflecting means.

20. The instrument of claim 19 wherein said second light deflecting means comprises a prism having cylindrical lens on one facet to focus the light into the narrow band.

21. The instrument of claim 20 wherein the prism is a right triangle shape having a cylindrical lens in the facet forming the surface in the second path, the axis of said cylindrical lens being parallel to the axis of the shaft.

22. The instrument of claim 17 wherein the light receiving means comprises a dial face which the second radial light beam strikes illuminating a portion thereof to provide a visual indication of shaft position.

23. The instrument of claim 22 wherein the second light deflecting means mounted on the shaft focuses the light, so that when light strikes the dial face a narrow radial segment which has a radial length substantially longer than the band's width is illuminated.

24. The instrument of claim 23 further comprised of a third light deflecting means comprising a conical band around the shaft having a mirrored surface inclined at an acute angle relative to the shaft axis to deflect light from the second path against the dial face.

25. The instrument of claim 17 wherein the light receiving means comprises:
a pair of light receiving means, each providing an output light signal when the second light deflecting means is oriented to illuminate each sensor, said sensor being angularly spaced apart to be illuminated as the shaft is rotated; and means responsive to the output signal of said sensors for indicating shaft position.

26. The instrument of claim 25 wherein the pair of light receiving means comprise a pair of photodiodes to convert the output light signals to electrical signals.

27. The instrument of claim 26 wherein the means for indicating shaft position further comprises a source of light oscillating at a fixed frequency to be optically coupled to the first path, and means to condition the output of the photodiodes to only allow the transmission of a signal of the same frequency and phase as the source of light.

28. The instrument of claim 27 wherein the means for indicating shaft position further comprises an RS flip-flop, the two inputs of which are connected to the conditioned output of the pair of photodiodes so that the output of the RS flip-flop will switch from OPEN to CLOSED as the second radial light path moves from one side of the pair of photodiodes to the other, sequentially illuminating them, the RS flip-flop output will revert to the OPEN condition when the light deflecting means is rotated in the opposite direction, causing both of the photodiodes to be illuminated in the reverse sequence.

29. The instrument of claim 25 further comprised of:

a housing which encloses the shaft, means for rotating the shaft, the first and second light deflecting means, and the pair of light receiving means; and a plurality of optical fibers, wherein the light source and means response to the output signal of said light receiving means for indicating shaft position is located remotely from the housing and connected by the optical fibers.

30. An electrical fiber optic control circuit for sensing shaft position given an input from a remote optical shaft position sensor which supplies two optic signal outputs when the shaft is rotatably oriented in two distinct positions, said control circuit comprising, in combination:

an oscillating source of light having a fixed frequency;

means for fiber-optically coupling the source of light to the remote optical shaft position sensor;

means for fiber-optically coupling the two outputs of the remote optical shaft position sensor to a pair of photodiodes to convert the optic input of the control circuit to electrical signals;

means to condition the output of the photodiodes to only transmit a signal of the same frequency and phase as the source of light; and an RS flip-flop, the two inputs of which are connected to the conditioned output of the pair of photodiodes so that the output of the RS flip-flop will switch from OPEN to CLOSED as the shaft is rotated past the two distinct shaft positions thereby sequentially providing two optic signal outputs, the RS flip-flop output will revert to the OPEN condition when the shaft is rotated in the opposite direction past both of the two distinct shaft positions.

31. The optical shaft position sensor of claim 13 wherein the light receiving means further comprises:

a pair of photodiodes each providing an electrical output signal when the second path is oriented to illuminate each photodiode, said photodiodes being angularly spaced apart to be sequentially illuminated as the shaft is rotated; and means responsive to the output signal of said photodiodes for indicating the shaft position.

* * * * *